Figure 1:
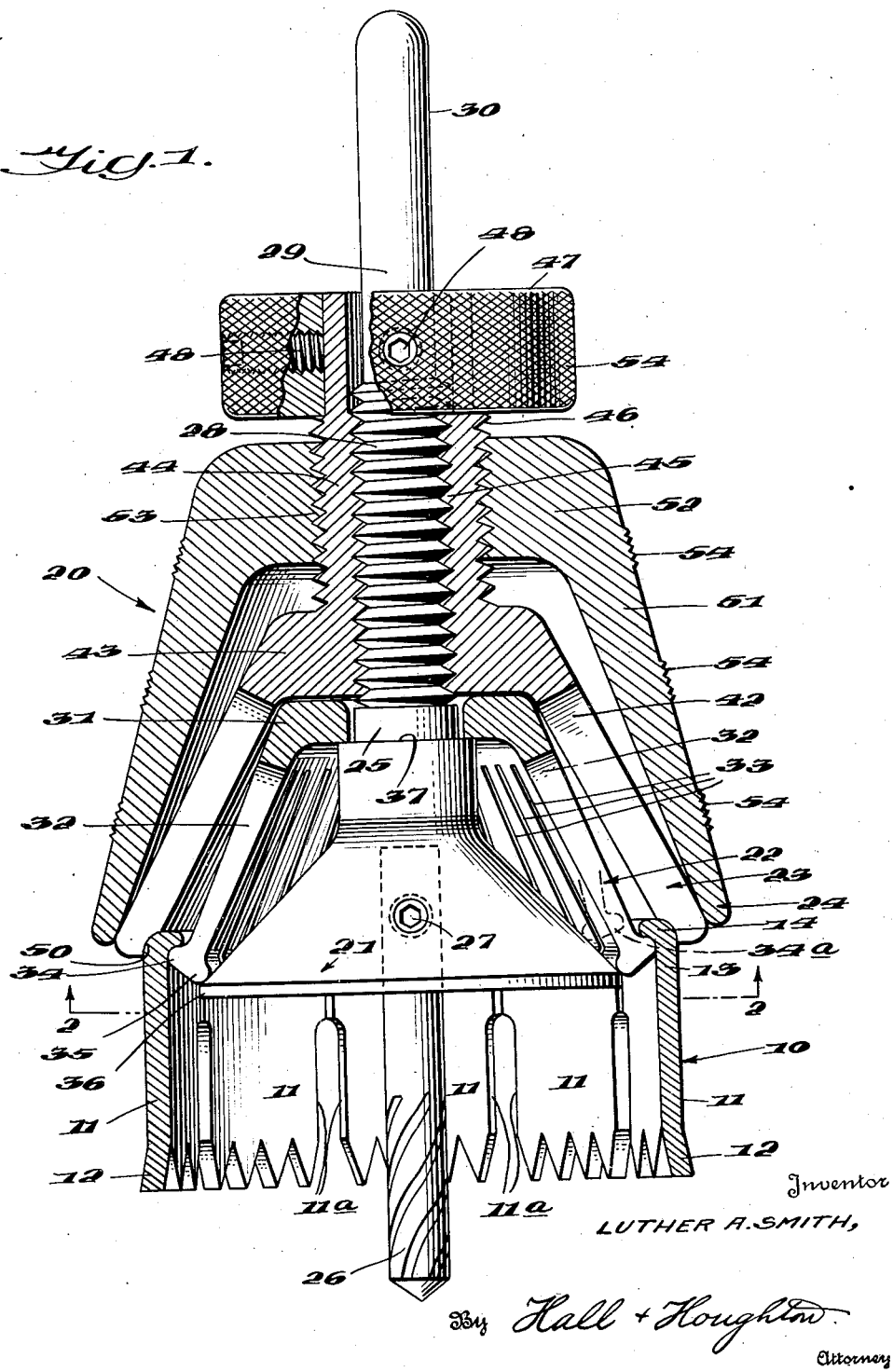

Sept. 20, 1949.　　　　L. A. SMITH　　　2,482,439
ADJUSTABLE HOLE-SAW

Filed May 16, 1946　　　　　　　　　2 Sheets-Sheet 2

Inventor
LUTHER A. SMITH,
By Hall & Houghton
Attorney

Patented Sept. 20, 1949

2,482,439

UNITED STATES PATENT OFFICE 2,482,439

ADJUSTABLE HOLE SAW

Luther A. Smith, Birmingham, Ala.

Application May 16, 1946, Serial No. 670,154

17 Claims. (Cl. 77—69)

This invention relates to hole-saws and aims generally to improve the same.

As heretofore constructed, hole-saws uniformly have provided only for the cutting of holes in sheet metal and the like of predetermined size. In most instances a separate tubular saw of fixed diameter has been required for each size of hole to be sawed, and a shop having a number of sizes of holes to be sawed, even of slightly differing diameters, has been required to maintain a separate saw for each size of hole. In some instances it has been proposed to wrap a saw blade around a cylindrical hub of fixed diameter, or insert it in one of a series of fixed concentric grooves in a cylindrical head. These proposals, however, have not solved the primary difficulty of inability to saw a bastard sized hole without awaiting the supply of a special saw, special hub of fixed diameter, or specially grooved head member, which even then might not remove the exact size hole required due to variation in the set of saw teeth. In addition such proposals have not solved the economic difficulty that such special saws are frequently apt to have utility only for one special job in hand, and hence render the cost of such job excessive.

The present invention aims to overcome these disadvantages of the prior practice and the provide a simple and effective solution of these problems. By employing the present invention, a shop may, with only a single set of hole-saws of reasonable number, saw holes of any one of an infinite number of sizes within the outside limits of the set. In addition, difficulty in obtaining a saw to saw holes to an exacting specification is eliminated.

Thus, a primary object of the invention resides in the provision of a hole-saw continuously adjustable between limits to facilitate the sawing of holes in sheet metal and the like of any desired standard or other size, within the outside limits of its range of adjustment.

A further object resides in the provision of an improved sectional hole-saw blade having an integral mounting bead or fillet adapting it for continuous adjustment for the sawing of bastard sized holes within predetermined limits.

A further object resides in the provision of an adjustable hole-saw body adapted to adjust the diameter of its blade for the sawing of holes of any standard or bastard diameter within its range.

Further objects and advantages of the invention as will appear from the following description of preferred embodiments thereof reside in the provision of improved features and combinations of parts contributing to the realization of the aforesaid objects.

In the accompanying drawings of a preferred embodiment illustrative of this invention:

Fig. 1 is an elevation partly in longitudinal section, with the saw in its expanded position.

Figure 2:
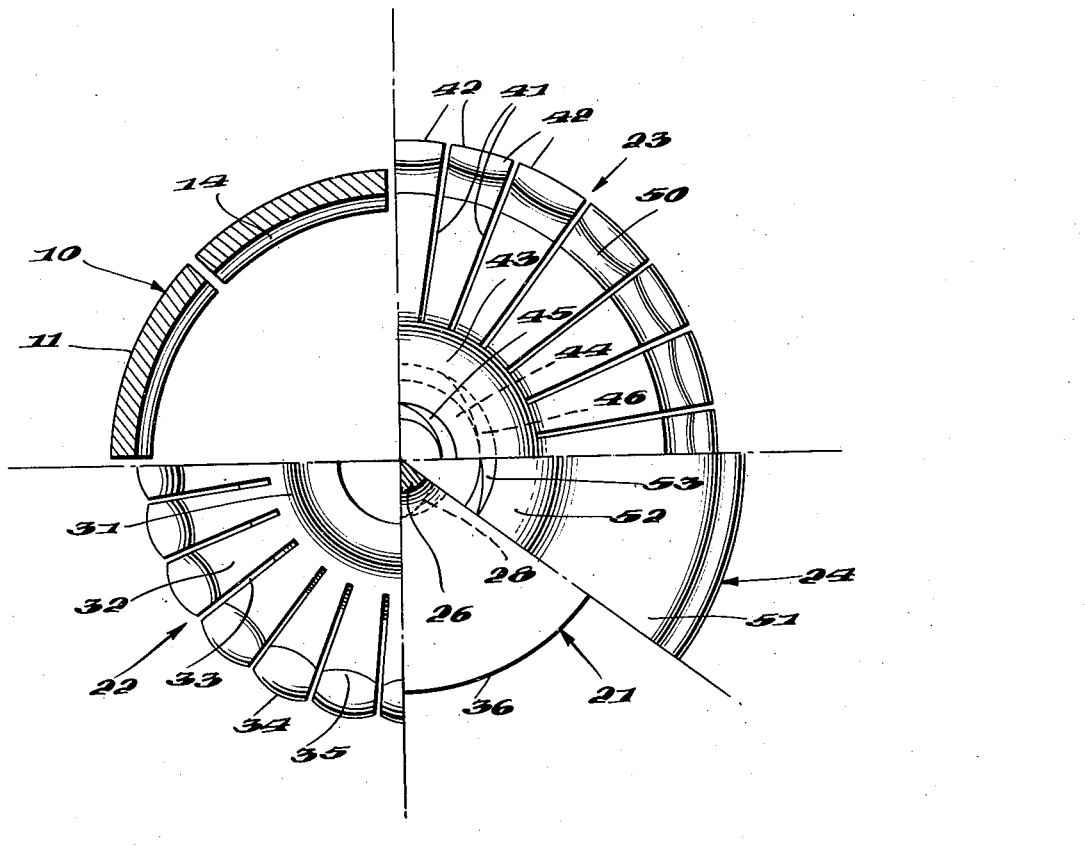

Fig. 2 is a composite sectional view of the elements 21, 22, 10, 23, and 24, respectively, viewed from the line 2—2, Fig. 1, looking in the direction indicated by the arrows.

In the illustrative embodiment shown in the drawings, the hole-saw comprises a tubular saw blade 10 and a supporting core 20 therefor, the core 20 being continuously adjustable in effective diameter and the blade 10 being split and flexible so that it may be flexed by such adjustment to adjust the effective diameter of the hole-saw for the sawing of holes of any size within the range of adjustment of the tool.

In the form shown the blade 10 is split sectioned so as to sub-divide it into a number of separate arcuate parts 11, there being eight such parts in the illustrative embodiment, and is provided with saw-teeth 12 at one of its ends and is adapted at its other end 13 to be retained by ring-like retaining elements of the supporting core 20 as hereinafter described. Such adaptation, as shown, is preferably afforded by providing the end 13 of the tubular saw blade with an integral mounting bead or fillet 14, shown as a continuous element, along its end edge 13, to constitute means flexibly engageable with elements of the supporting core 20 for retaining the saw blade therein. In its preferred embodiment the saw blade 10 is composite, the teeth 12 being formed of high speed tool steel or the like, and being electrically welded to the saw-blade body 10, which is preferably constructed of mild steel, this preferred arrangement being especially adapted to provide for uniform flexing of the tubular saw blade during expansion and contraction of its effective diameter, to conform arcuately to the changed diameter, and avoid any undue change in the channelling thickness of the blade. In its preferred form, the side edges of the saw sections 11 are relieved as at 11a. Thus when the unrelieved portions of the sections, adjacent the fillet 14, contact with one another to establish the minimum diameter of the saw, no stress is exerted at the toothed portion of the saw, and clearing channels are afforded by the relieved sections 11a.

As shown in the drawings the supporting core 20 in which the saw blade 10 is mounted, comprises an expanding means 21, an expansible saw blade support 22 expanded thereby, and means 23—24 for retaining the saw blade thereagainst. The expanding means shown comprises a conical expander 21, preferably ground on a 45° angle, as shown, carried on or integral with a stem 25, in association with which is preferably assembled a pilot drill or other centering means 26 shown as snugly fitted in a bore or socket drilled axially of the stem 25 and secured therein in any suitable manner, as by countersunk set screw 27, for example. Preferably, for the purpose hereinafter described, a shoulder 37 is provided extending outwardly from stem 25, herein formed integral with the conical expanding member 25.

The stem or spindle 25, as shown, is threaded in one sense, preferably the lefthand sense, through a substantial part of its length, as shown at 28, and is of a reduced diameter 29 thereabove, the portion 29 preferably terminating in a spindle 30 ground to fit in a standard chuck or collet (not shown). This arrangement of the stem allows the expansible saw-blade support 22 with its cooperating members 23 and 24, to be mounted in association with expander 21 by assembling them over the reduced diameter sections 30, 29 and threaded sections 28 of the stem 25, as hereinafter described. Assembly 25—30 is preferably of tool steel, suitably hardened.

The expansible saw blade support 22 in the form shown comprises a tubular spider or spider-cone which fits loosely on the threaded stem 25, and is constructed of suitable material, preferably tool steel. The construction of this member 22 is such that it provides an annular collar 31 surrounding the stem 25 and carrying swingable arms 32 herein formed by milling away slots 33 in the skirt of the bell-like blank from which the spider is formed, thus resiliently providing for their being swung inwardly and outwardly. The lower ends of the spider arms 32 as shown at 34 are externally machined with a ball effect shaped to engage under or with the beaded or filletted portion 14 of the saw blade 10 to retain the same in place, the circumferential series of these shaped elements 32 in effect constituting an expansible ring-like retaining means for the saw blade. Any number of slots 33 may be employed in this arrangement, twenty-four, as indicated in Fig. 2, having been found appropriate for a tool designed to have a continuous expansion range of from 1.99 inches to 2.26 inches, for example. In addition the spider-cone 22, as shown, has its arms 32 provided with suitable elements for bearing on the conical surface of expander 21, said elements, in the form shown, comprising ball-surfaced inwardly extended cam-like means 35 slidable on the conical surface of expander 21 as the spider 22 is moved axially relative thereto. In its preferred arrangement the initial effective outside diameter of the spider-cone at 34 is approximately equal to the outside diameter of the lower flared end of the expander 21, so that in its fully contracted state it lies in the dotted line position 34a, Fig. 1. The lower limit on the range of expansion of the hole-saw is established by contact of the unrelieved portions of the saw sections 11 with one another, and in this position the saw-blade 10 just escapes contact with the end edge 36 of the conical member 21.

As above mentioned, a shoulder 37 is provided in surrounding relation to stem 25 and within the spider cone 22, and when the spider 22 is expanded to the position shown in full lines in Fig. 1, the underside of cone collar 31 abuts the shoulder 37, thus establishing the maximum of the range of expansion of the hole-saw. Also in this embodiment, as is apparent from Fig. 1, the effective length of the conical member 21 as an expander lies between the positions of the parts indicated at 34 and 34a, and that portion of the expander 21 beyond this range may be shaped in any desired manner or set back toward the axis of the tool for economy of metal.

The outer spider-cone 23, in the form shown, constitutes further supporting means for the saw blade acting, in paired relation with the inner spider-cone 22, to retain the saw blade 10 between them. The outer spider cone assembly 22, in the form shown, also includes means for adjusting the hole-saw to various effective diameters. For these purposes, in the form shown, the outer spider cone 23, as best shown in Fig. 2, is preferably formed, like the inner cone 22, by slotting of a bell-shaped blank as at 41 to divide the skirt portion thereof into flexible spider arms 42, having a substantial undivided collar 43 for engagement on stem 25. Any suitable number of slots 41 may be employed, twenty-four being shown in the illustrative embodiment. In the preferred form shown in the drawings, the outer spider cone 23 is provided with a sleeve 44 internally threaded as at 45, preferably in a lefthand sense, for threaded engagement with the threaded portion 28 of stem 25. Sleeve 44 is also externally threaded, preferably in the same sense, as shown at 46, and is adapted to have fixed to its upper end a suitable handle or the like 47, shown as suitably secured on a reduced section of the sleeve 44, as by the countersunk set screws 48 set at right angles to each other. In the preferred form of the invention the inner faces of the tips of spider arms 42 are machined to present a concave blade retaining groove 50 of relieved shape, and are thus adapted to contact the saw blade at their central areas throughout the range of adjustment of the hole saw.

The external threading 46 of sleeve 44, in the form shown, constitutes means for associating an adjustment locking cone 24 with the outer spider cone 23. In the illustrative embodiment this locking cone 24 is of tapered bell shape, and is proportioned to contact the spider arms or fingers 42 of the outer spider-cone 23 and clamp the ends of these fingers and the associated saw blade and inner spider fingers 32 tightly against the conical expander 21 in any position of adjustment of the hole saw. Its tapered skirt 51 depends from a central hub 52, threaded at 53 to engage with the threads 46 on the outer spider cone sleeve 44.

Preferably, as in the form shown, the outer surfaces of adjusting handle 47 and of clamping cone 24 are knurled or otherwise finished, as indicated at 54, to facilitate gripping of the parts for unclamping, adjusting and reclamping the tool.

In assembly and operation of the illustrative embodiment, the pilot drill 26 is first secured in its socket by the set screw 27 and inner spider cone 22 is dropped in place against the conical expander 21. The outer assembly 23, 44, 47, 24, made up of outer spider cone 23 carrying the handle 47 on its sleeve 44 and having its clamp cone 24 backed off towards its handle 47, is next threaded onto the stem 25 until it approaches inner spider cone 22. The saw blade sections 11 are now assembled between the paired rings afforded, in effect, by the shaped tips 34 and 41 of the two spider cones. By slightly advancing assembly 23, 44, 27, 24 on stem 25, the fillets 14 of the split saw 10 are firmly gripped between the surfaces 34 and 50, retaining the saw in place. Further advance of the assembly 23, 44, 47, 24 toward the conical expander 21 pushes the inner spider cone 22 ahead of it, and causes the spider cones, and the split saw carried therebetween, to expand in direct proportion to the amount of advance until further advance is prevented by the limit shoulder 37. Tightening of the clamping cone 24 by threading it forwardly in assembly 23, 44, 47, 24 in any adjusted position of the latter, firmly clamps the spider cones and saw in their adjusted relation against the conical expander 21 securely locking the adjustment. The preferred embodiment, the inter-engaging threads of which are lefthanded, is intended to be driven in a righthanded sense and its pilot drill 26 and saw teeth 12 are formed accordingly. By this arrangement loosening of the parts during the sawing of a hole is obviated. The mode of construction of the saw blade itself, assures acceptance by the saw blade of the diameter established by the cones, and insures against any undue increase in the kerfing width.

Each tube saw according to this invention covers an entire range of hole sizes between predetermined limits and preferably is capable of slightly exceeding the upper and lower ranges of such limits. Thus in the example mentioned, called a 2 to 2¼ inch hole-saw, the saw preferably is contractable to 1.99 inches and extendable to 2.26 inches diameter so that 2 inch and 2¼ inch diameters may be attained irrespective of the degree of set imparted to the saw teeth. With this provision a small number of continuously adjustable hole-saws of differing size range assures a shop the ability to saw holes of any standard or bastard size, and no saw is but a special tool applicable to a single job only. Further, the continuous adjustability of this saw enables sawing of any prescribed size of hole, regardless of variation in the set of the saw teeth, which may be compensated for by varying the adjustment.

From the foregoing description it will be apparent that the embodiments shown and described are but illustrative and not restrictive of the invention hereindescribed and claimed, and that inventive features and combinations of this disclosure may be embodied in other specific forms.

I claim:

1. A hole-saw of the type comprising a tubular saw blade and a supporting core therefor, particularly characterized in that the supporting core for the saw blade comprises an expansible saw blade support with means for expanding the same and means for retaining the saw blade thereagainst and in that the saw blade is a split flexible blade flexed by adjustment of said expansible support and said blade retaining means to adjust the effective diameter of the blade for the sawing of holes of any desired size within the limits of adjustment.

2. A hole-saw of the type comprising a tubular saw blade and a supporting core therefor, particularly characterized in that the supporting core for the saw blade comprises a conical expander and an expansible saw blade support slidable thereover and expanded thereby and includes expansible means for retaining the saw blade against said support, and in that the saw blade is a split flexible blade flexed by adjustment of said support and expansible retaining means on said expander to adjust the effective diameter of the blade for the sawing of holes of any desired size within the limits of adjustment.

3. A hole-saw of the type comprising a tubular saw blade and a supporting core therefor, particularly characterized in that the supporting core for the saw blade comprises a conical expander and paired expansible saw blade supports slidable thereover and expanded thereby and retaining the saw blade between them and in that the saw blade is a split flexible blade flexed by adjustment of said supports on said expander to adjust the effective diameter of the blade for the sawing of holes of any desired size within the limits of adjustment.

4. A hole-saw of the type comprising a tubular saw blade and a supporting core therefor, particularly characterized in that the supporting core for the saw blade comprises a conical expander and paired expansible saw blade supports slidable thereover and expanded thereby and retaining the saw blade between them, in that the saw blade is a split flexible blade flexed by adjustment of said supports on said expander to adjust the effective diameter of the blade for the sawing of holes of any desired size within the limits of adjustment, and in that said hole-saw comprises means for locking said supports and saw blade to said expander in the adjusted position thereof.

5. A hole-saw of the type comprising a tubular saw blade and a supporting core therefor, particularly characterized in that the supporting core for the saw blade comprises a conical expander and an expansible saw-blade support including an expansible tubular spider axially slidable over said expander and expanded thereby and means for retaining the saw blade against said spider, and further characterized in that the saw blade is a split flexible blade flexed by adjustment of said support on said expander to adjust the effective diameter of the blade for the sawing of holes of any desired size within the limits of adjustment.

6. A hole-saw of the type comprising a tubular saw blade and a supporting core therefor, particularly characterized in that the supporting core for the saw blade comprises a conical expander and an expansible saw-blade support including an expansible spider cone axially slidable over said expander and expanded thereby and means for retaining the saw blade against said spider cone, and further characterized in that the saw blade is a split flexible blade flexed by adjustment of said spider cone on said expander to adjust the effective diameter of the blade for the sawing of holes of any desired size within the limits of adjustment.

7. A tubular hole-saw blade having saw teeth along one of its end edges and an integral mounting bead or fillet along the other of its end edges, said blade and its bead being flexible and being split from one of its ends to the other to enable its effective diameter to be changed.

8. A tubular hole-saw blade having saw teeth along one of its end edges and an integral mounting bead or fillet along the other of its end edges, said blade and its bead being flexible and being split-sectioned from one of its ends to the other whereby its sections may separate as they are spread apart and flexed to change the effective diameter of the hole saw.

9. A tubular hole-saw blade having saw teeth along one of its end edges and an integral mounting bead or fillet along the other of its end edges, said saw teeth being of high speed tool steel and the balance of said saw blade being of mild steel and having said teeth welded thereto, said blade and its bead being flexible, said blade being split from one of its ends to the other, whereby said blade may be expanded in effective diameter without undue change in its channelling thickness.

10. An expansible tubular hole-saw blade split sectioned from one of its ends to the other to subdivide it into separate arcuate sections, said blade having saw teeth along one of its edges of high speed tool steel and having the balance of its body of mild steel, said sections on change of the effective diameter of the tubular saw, separating circumferentially and flexing individually to conform arcuately to the changed diameter.

11. A hole-saw comprising a split tubular hole-saw blade, a central support, a conical expander carried thereby, a pair of spider cones slidable axially over said conical expander and expansible thereby and retaining said blade between their flared ends, the toothed edge of said blade extending below said expander and the flared ends of said spider cones being offset to support said blade in surrounding relation to said expander when said cones are contracted, and in outwardly displaced relation thereto when said cones are expanded, means for adjusting the axial relation of said spider cones to said conical expander to adjust the diameter of said blade, and means for locking said spider cones in adjusted position.

12. A hole-saw according to claim 11, said adjusting means comprising a threaded engagement between said central support and the outer of said pair of spider cones.

13. A hole-saw according to claim 11, said adjusting means comprising a threaded engagement between said central support and the outer of said pair of spider cones, and said locking means comprising a locking cone threadedly engaged with the outer of said pair of spider cones and in its locking position clamping to said conical expander the flared ends of said spider cones and the saw blade embraced therebetween.

14. A hole-saw comprising a split tubular hole saw blade, a threaded stem, a conical expander carried by said stem, a pair of nesting expansible spider-cones carried on said stem and nesting against said expander and retaining said saw blade between their flared ends, the outer of said spider cones being threadedly engaged with said stem and having an axially extending externally threaded sleeve, and a locking cone threadedly engaging said threaded sleeve and formed to nest on and embrace the flaring ends of said spider cones to lock them against said expander.

15. A hole-saw according to claim 14, in which the stem further carries an abutment contacted by the inner of said spider-cones to limit the maximum expansion of said cones by said conical expander.

16. A hole-saw according to claim 14, in which said sleeve is provided with a gripping handle at the end of its threaded section, and in which said stem extends above said gripping handle, whereby, on holding said handle, said locking cone may be turned on said sleeve to free or lock said spider cones, and on turning said handle about said stem, said spider cones may be expanded or contracted to continuously adjust the effective diameter of said split tubular saw blade.

17. In a hole-saw, a pair of concentric expansible and contractible retaining rings, a split tubular hole-saw blade retained therebetween, and a pair of conical members between which said rings are embraced, said members being adjustable relative to said rings to expand them to a greater or lesser extent and to lock them in their adjusted position of expansion.

LUTHER A. SMITH.

REFERENCES CITED

The following references are of record in the file of this patent:

UNITED STATES PATENTS

| Number | Name | Date |
| --- | --- | --- |
| 493,730 | MacKenzie | Mar. 21, 1893 |
| 703,538 | Cartwright | July 1, 1902 |
| 717,702 | Murphy | Jan. 6, 1903 |
| 1,449,790 | Sprague | Mar. 27, 1923 |
| 1,590,994 | Misener | June 29, 1926 |
| 1,596,197 | Lindgren | Aug. 17, 1926 |
| 1,620,255 | Hall | Mar. 8, 1927 |
| 2,349,400 | Beckwith | May 23, 1944 |

FOREIGN PATENTS

| Number | Country | Date |
| --- | --- | --- |
| 203,570 | Great Britain | Oct. 30, 1922 |